(12) United States Patent
Noake et al.

(10) Patent No.: US 6,751,222 B1
(45) Date of Patent: Jun. 15, 2004

(54) ATM COMMUNICATION APPARATUS AND ATM SIGNALING METHOD

(75) Inventors: Toshimichi Noake, Kanagawaken (JP); Tadashi Tamaoki, Kanagawaken (JP); Toru Aramaki, Kanagawaken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,772

(22) Filed: Oct. 19, 1999

(30) Foreign Application Priority Data

Oct. 20, 1998 (JP) .......................................... 10-315335

(51) Int. Cl.[7] .............................................. H04L 12/28
(52) U.S. Cl. ....................................... 370/395; 320/352
(58) Field of Search ................................ 370/395–397, 370/395.5–395.52, 395.6–395.65, 466–468, 465, 474, 352–356, 335–338, 310.1, 401, 217, 281, 386, 385, 522, 354; 455/422–445, 560, 408

(56) References Cited

U.S. PATENT DOCUMENTS

| | | | | |
|---|---|---|---|---|
| 5,699,359 A | * | 12/1997 | Suga | 370/395 |
| 5,943,337 A | * | 8/1999 | Sasagawa | 370/395 |
| 5,953,651 A | * | 9/1999 | Lu et al. | 455/408 |
| 6,108,336 A | * | 8/2000 | Duault et al. | 370/395 |
| 6,363,064 B1 | * | 3/2002 | Yamaguchi | 370/352 |
| 6,404,782 B1 | * | 6/2002 | Berenbaum et al. | 370/522 |

* cited by examiner

*Primary Examiner*—Chi Pham
*Assistant Examiner*—Prenell Jones
(74) *Attorney, Agent, or Firm*—Antonelli, Terry, Stout & Kraus, LLP

(57) ABSTRACT

In an ATM network having a non-ATM apparatus such as a PBX, a band and various apparatuses are effectively used by employing SVC, so that a ring back tone, etc., is transmitted to the non-ATM apparatus of originating side. An ATM signaling apparatus 210 comprises a signaling convert section 201 for making conversion of signaling information between an ATM network 220 and a PBX 230, and a cell assembly and disassembly section (CLAD) 204 for cell assembling and disassembling user information. An ATM signaling interface section 203 receives and transmits ATM signaling information from/to the ATM network 220, and sends a user VC connect and a release indication 209 to the CLAD section 204. An non-ATM signaling interface section 202 receives and transmits PBX signaling information from/to the PBX 230. User information 206 and a user information cell 208 sent from the PBX 230 and the ATM network 220 is cell assembled and cell disassembled by the CLAD section 204.

18 Claims, 15 Drawing Sheets

ATM COMMUNICATION APPARATUS AND ATM SIGNALING METHOD

BACKGROUND OF THE INVENTION

The present invention relates to an ATM signaling apparatus and an ATM signaling method and more particularly to an ATM signaling apparatus, which makes communications between communication apparatuses such as a Private Branch Exchange (PBX) using an Asynchronous Transfer Mode (ATM) communication network, at a Switched Virtual Connection (SVC) and relates to an ATM signaling method.

FIG. 14 shows a sequence view of communication establish in a case of a conventional Permanent Virtual Connection (PVC). The following will explain a Virtual Channel (VC) connecting operations among a PBX 30 of originating side, an ATM network 20, and a PBX 31 of destinating side in prior art. Here, the PBX 30 of originating side and the PBX 31 of destinating side are connected to the ATM network 20 through an ATM transmission apparatus.

In the ATM network 20, a VC is permanently connected by a PVC. When the PBX 30 of originating side sends setup signals, the ATM network 20 permanently relays the setup signals to the PBX 31 of destinating side by a PVC. Similarly, a telephone number sent from the PBX 30 of originating side is relayed to the PBX 31 of destinating side. A ring back tone or a busy tone is transmitted to the PBX 30 of originating side from the PBX 31 by a PVC. Here, when the PBX 31 of destinating side responses, connection is established by a PVC. After the connection, when the PBX 30 of originating side sends a disconnect request, it is relayed to the PBX 31 of destinating side by a PVC.

Next, FIG. 15 shows a sequence view of conventional communication establish in the ITU-T (International Telecommunication Union-Telecommunication) standardization sector, Q. 2931.

Hereinafter, VC connecting operations among the PBX 30 of originating side, a PBX interface 10 of originating side, the ATM network 20, a PBX interface 11 of destinating side and the PBX 31 of destinating side will be explained. Each of the PBX interfaces 10 and 11 comprises a non-ATM signaling interface section 2 and an ATM signaling interface section 3.

When the PBX 30 of originating side sends the setup signal, the non-ATM signaling interface section 2 of the PBX interface 10 receives the setup signals of a PBX and waits for reception of a telephone number. Upon receipt of the telephone number, the non-ATM signaling interface section 2 conducts an analysis of number, and sends a setup request of originating side to the ATM signaling interface section 3. The ATM signaling interface section 3 converts the telephone number to ATM address and sends a SETUP message to the ATM network 20. The ATM network 20 relays the SETUP message.

Upon receipt of the SETUP message from the ATM network 20, the ATM signaling interface section 3 of the PBX interface 11 of originating side converts ATM address to the telephone number and sends a setup request of destinating side to the non-ATM signaling interface section 2. The non-ATM signaling interface section 2 sends an alert indication to the ATM signaling interface section 3 after sending the setup signal and telephone number to the PBX 31. The ATM signaling interface section 3, which has received the alert indication, sends an ALERT message to the ATM network 20, and the ATM network 20 relays it to the PBX interface 10.

The ATM signaling interface section 3 of the PBX interface 10 of originating side receives the ALERT message from the ATM network 20. At this time, the PBX 31 of destinating side sends the ring back tone and busy tone but these tones are not relayed between the PBX 30 of originating side and the PBX 31 of destinating side.

Upon receipt of response signals from the PBX 31 of destinating side, the non-ATM signaling interface section 2 of the PBX interface 11 of destinating side sends a response request to the ATM signaling interface section 3. The ATM signaling interface section 3, which has received the response request, sends a CONNECT message to the ATM network 20. The ATM network 20 relays the CONNECT message and sends back a connect acknowledge (CONN ACK) message.

Upon receipt of the CONNECT message from the ATM network 20, The ATM signaling interface section 3 of the PBX interface 10 of originating side sends a response request to the non-ATM signaling interface section 2. After receiving the response request, the non-ATM signaling interface section 2 of originating side sends response signals to the PBX 30 of originating side, and a connection path is established.

At the time of transmitting PBX traffic using an ATM network, a band for PBX traffic of an ATM network was always occupied regardless of use or nonuse when PBX traffic was transmitted in an ATM network by a PVC of permanent connection as in prior art, so that the merit of statistic multiplexing, which was a merit of an ATM, was not obtained. Also, since the connection of an ATM network was the permanent connection, relay and exchange of PBX traffic were performed by a PBX. For this reason, according to this system, the number of interface circuit unit cards provided between an ATM cell assembly and disassembly section and a PBX for relay was increased, and extra communication channels and bands up to the PBX for relay were needed. Then, there was a possibility that the entirety of network would be noncommunicable when the ATM cell assembly and disassembly section containing a PBX for relay was down. Moreover, since the connection of an ATM network was the permanent connection regardless of use and nonuse, traffic statistic of a PBX was not controlled on an ATM network.

Further, no user VC is connected until the CONNECT message is received when connection establish system in the ITU-T Q. 2931 is employed as in prior art. This causes a problem in which information, which is sent to an apparatus of originating side from the apparatus of destinating side during the connection, cannot be transmitted on a user VC. For example, connection information such as the ring back tone of a PBX of destinating side, and the busy tone cannot be transmitted to a PBX of originating side through an ATM network. Furthermore, since the signaling convert section has no function of receiving and analyzing signaling information for PBX communication establish, the impetus for call out, call in, call end cannot be recognized at the time of using a SVC in an ATM network.

SUMMARY OF THE INVENTION

In consideration of the aforementioned problems, the present invention aims to make effective use of a band and the respective apparatuses by employing a SVC in an ATM network comprising communication apparatuses such as a PBX, etc. Also, an object of the present invention is to transmit connection information (ring back tone, busy tone, etc.) of a communication apparatus of destinating side during the connection to a communication apparatus of originating side.

Moreover, it is an object of the present invention to count and collect call duration of a communication apparatus on the basis of call duration of an ATM network. Furthermore, the object of the present invention is that a signaling convert section reports a use band to an ATM network, so that an ATM band to be used by a communication apparatus is set on the basis of a configuration.

According to a first solving means of the present invention, there is provided an ATM signaling apparatus, which connects a communication apparatus to an ATM network so as to allow communications between a plurality of communication apparatuses to be carried out through said ATM network, said apparatus comprising:

a signaling convert section having means for receiving and transmitting first signaling information to be used in the communication apparatus from/to the communication apparatus, means for receiving and transmitting ATM signaling information to be used in the ATM network from/to the ATM network, means for interworking said first signaling information and said ATM signaling information, and means for interworking a first signaling process and an ATM signaling process; and a cell assembly and disassembly section for cell assembling user information from said communication apparatus to be transmitted to said ATM network on one hand and for cell disassembling user information from said ATM network to be transmitted to said communication apparatus on the other hand, whereby establishing and disconnecting communications between communication apparatuses in accordance with said ATM signaling process.

Also, in the ATM signaling apparatus of the present invention, wherein said signaling convert section comprises:

a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process;

an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process; and means for receiving and transmitting information between said first signaling interface and said ATM signaling interface.

According to a second solving means of the present invention, there is provided an ATM signaling method, which connects a communication apparatus to an ATM network so as to allow communications between a plurality of communication apparatuses to be carried out through said ATM network, said method comprising:

a function of receiving and transmitting first signaling information used in the communication apparatus from/to the communication apparatus;

a function of converting said first signaling information to ATM signaling information to be used in the ATM network;

a function of converting a first signaling process used in the communication apparatus to an ATM signaling process to be used in the ATM network;

a function of receiving and transmitting said ATM signaling information from/to said ATM network;

a function of converting said ATM signaling information to said first signaling information;

a function of converting said ATM signaling process to said first signaling process; and a function of cell assembling user information from said communication apparatus so as to be transmitted to said ATM network on one hand, and cell disassembling user information from said ATM network to be transmitted to said communication apparatus on the other hand, whereby establishing and disconnecting communications between communication apparatuses in accordance with said ATM signaling process.

BRIEF DESCRIPTION OF THE DRAWINGS

DETAILED DESCRIPTION OF THE PREFERRED EMBODIMENTS (1) System Configuration FIG. 1 shows an example of a network configuration view relevant to the present invention. In such network, there are provided ATM switches 100, routers 101, host computers 102, private branch exchanges (PBX) 103, telephones 104, facsimile apparatuses (FAX) 105, and an ATM network 106. One ATM switch 100 bundles signals from the router 101, the host computer 102 and the PBX 103. One ATM switch 100 is connected to the other ATM switch 100 via the ATM network 106. Thus, data is received and transmitted between one ATM switch 100 and each of the router 101, the host computer 102, the PBX 103, which are connected to the ATM switch 100 on the other end. Each PBX 103 contains terminals such as the telephone 104 and the FAX 105, and digitizes signals from these terminals so as to be exchanged. One PBX 103 is connected to the telephone 104 and the FAX 105, which the other PBX 103 contains.

Figure 1:
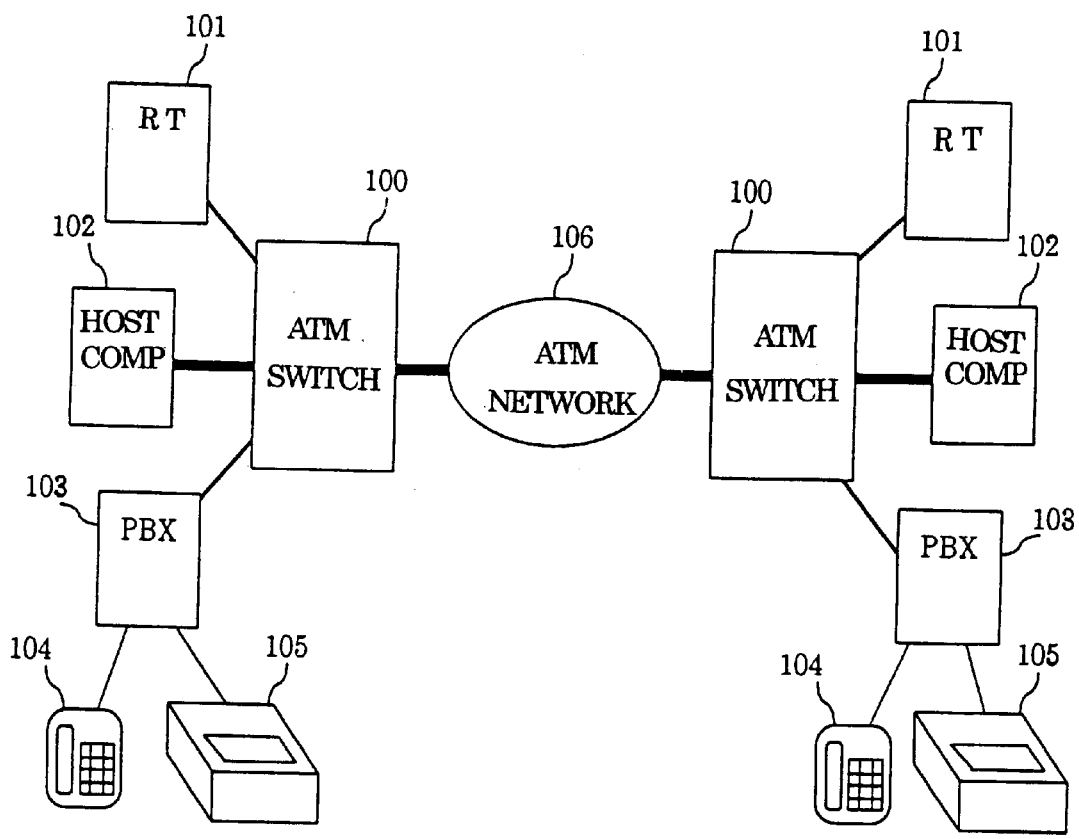
FIG. 1 is a network configuration view relevant to the present invention.
Figure 2:
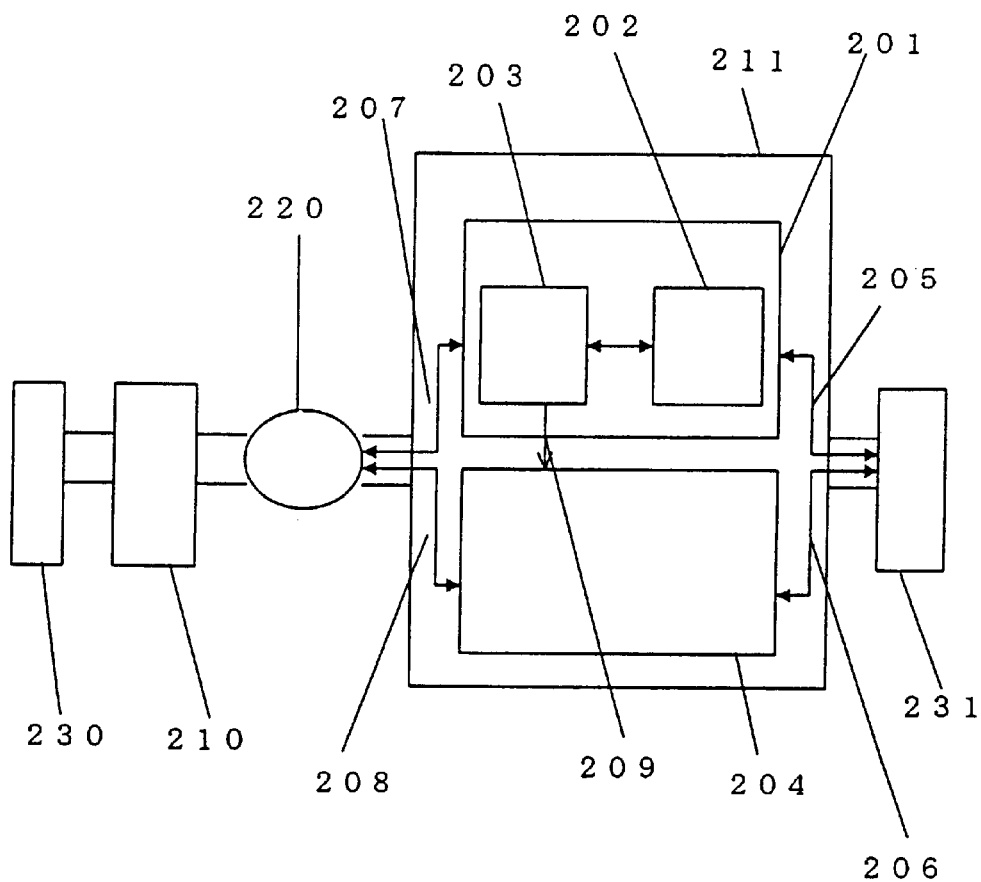
FIG. 2 is an entire configuration view for realizing an ATM signaling method according to the present invention.

FIG. 2 shows an example of an entire configuration view for achieving an ATM signaling method according to the present invention. In such entire configuration, there are provided PBXs 230 and 231, ATM signaling apparatuses 210 and 211, and an ATM network 220. Here, as one example, the ATM signaling apparatuses 210 and 211 are configured to be connected as an interface between each of the PBX 230 and 231 and the ATM network 220. It should be noted that the ATM signaling apparatuses 210 and 211 may be provided between the ATM switch 100 and the PBX 103 individually or at the internal portion of the ATM switch 100 or that of the PBX 103 suitably. Hereinafter, communications between the PBX 230 and the PBX 231 provided at the other end will be explained in a case in which Switched Virtual Connection (SVC) is employed by use of the ATM network 220. It should be noted that the communication apparatus, which the ATM signaling apparatus of the present invention contains, is not limited to a PBX, and any apparatus can be applied if it is a non-ATM apparatus that has no ATM system used.

Each of the ATM signaling apparatuses 210 and 211 shown in FIG. 2 comprises a signaling convert section 201 for making conversion of signaling information between the ATM network 220 and the PBX 230 and a Cell Assembly Disassembly (CLAD) section 204 for cell assembling and disassembling user information.

The signaling convert section 201 comprises an ATM signaling interface section 203 and a non-ATM signaling interface section 202. The ATM signaling interface section 203 receives and transmits from/to, for example, ATM signaling information of the ATM network 220, and sends a user VC connect and release indication 209 to the CLAD section 204. The non-ATM signaling interface section 202 receives and transmits from/to, for example, PBX signaling information of the PBX 230.

User information 206 sent from the PBX 230 is cell assembled by the CLAD section 204, and sent to the ATM network 220. User information cell 208 sent from the ATM network 220 is cell disassembled by the CLAD section 204, and sent to the PBX 230. The CLAD section 204 performs a VC connection on the basis of virtual path identifier (VPI)/virtual channel identifier (VCI) information sent from the ATM signaling interface section 203 and the connect indication 209, and starts to cell assemble.

Figure 3:
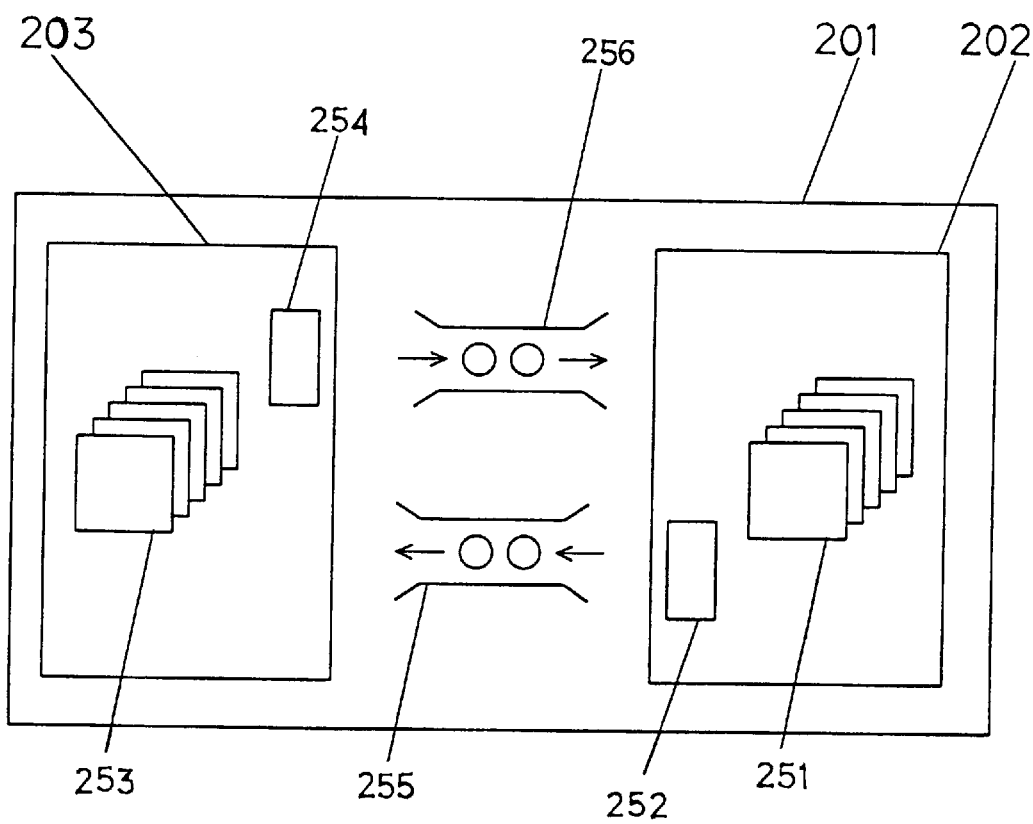
FIG. 3 is a detailed configuration view of a signaling convert section.

FIG. 3 is a detailed configuration view of the signaling convert section.

The non-ATM signaling interface section 202 comprises non-ATM status control tables 251 corresponding to the number of channels of a PBX to carry out a status control of a PBX. Also, the non-ATM signaling interface section 202 comprises an address conversion table 252 for converting non-ATM address to ATM address, and performs conversion of address at an originating time in an ATM direction from a PBX. The ATM signaling interface section 203 comprises ATM status control tables 253 corresponding to the number of channels of ATM network to carry out a status control between ATM network. Also, the ATM signaling interface section 203 comprises an address conversion table 254 for converting ATM address to non-ATM address, and performs conversion of address at a destinating time in a PBX direction from an ATM network. For example, receiving and transmitting means such as bidirectional message queues 255 and 256 is provided between the non-ATM signaling interface section 202 and the ATM signaling interface section 203, and the exchange of information such as a request and a response, etc., is performed by message receiving and transmitting between the respective portions.

Figure 4:
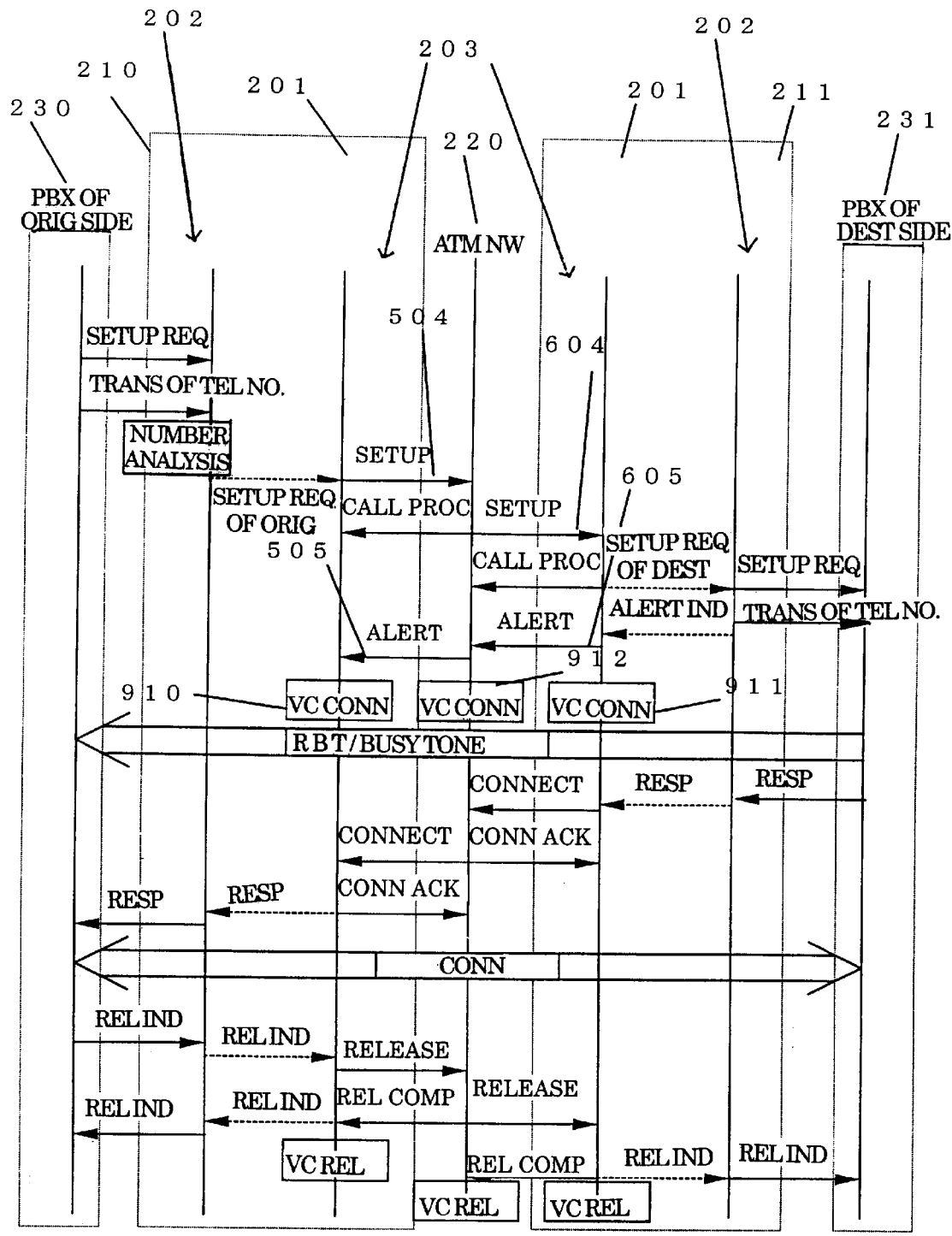
FIG. 4 is an operation sequence view in which the ATM signaling method of the present invention and its apparatus are applied to a channel associated connection.
Figure 5:
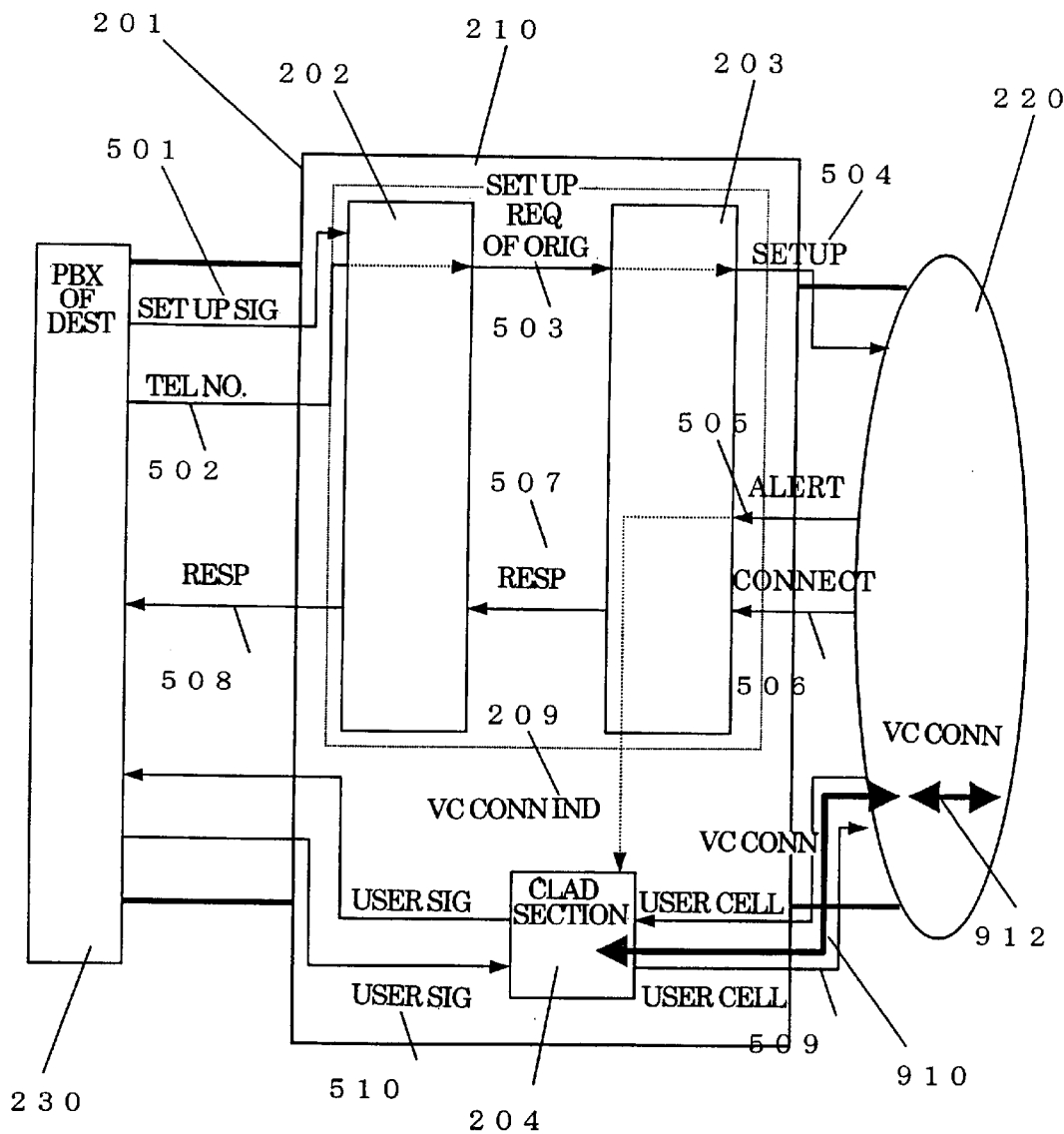
FIG. 5 is an operation sequence view of a call establish of originating side in the case of the channel associated connection.
Figure 6:
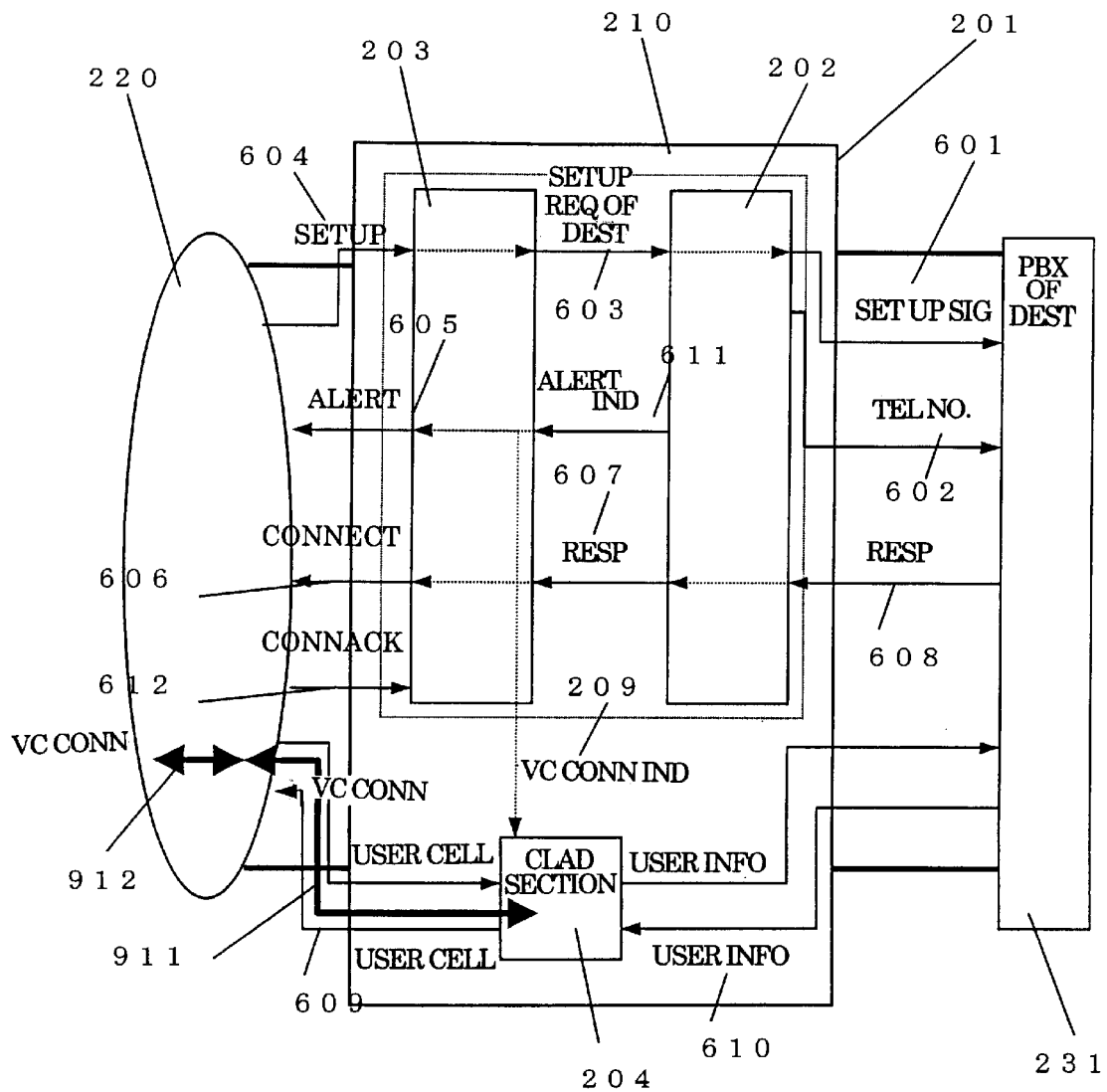
FIG. 6 is an operation sequence view of a call establish of destinating side in the case of the channel associated connection.
Figure 7:
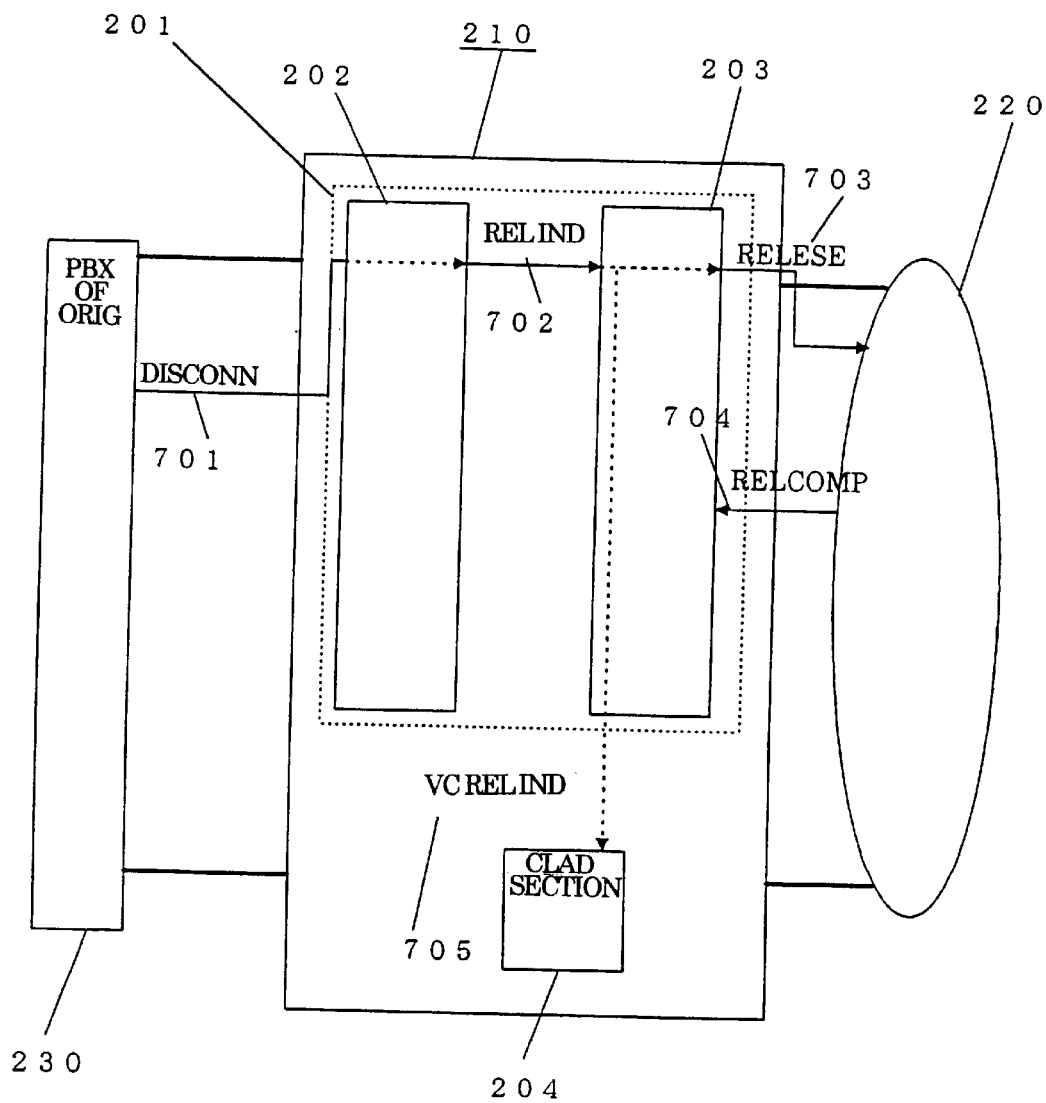
FIG. 7 is an operation sequence view of a call disconnect of originating side in the case of the channel associated connection.
Figure 8:
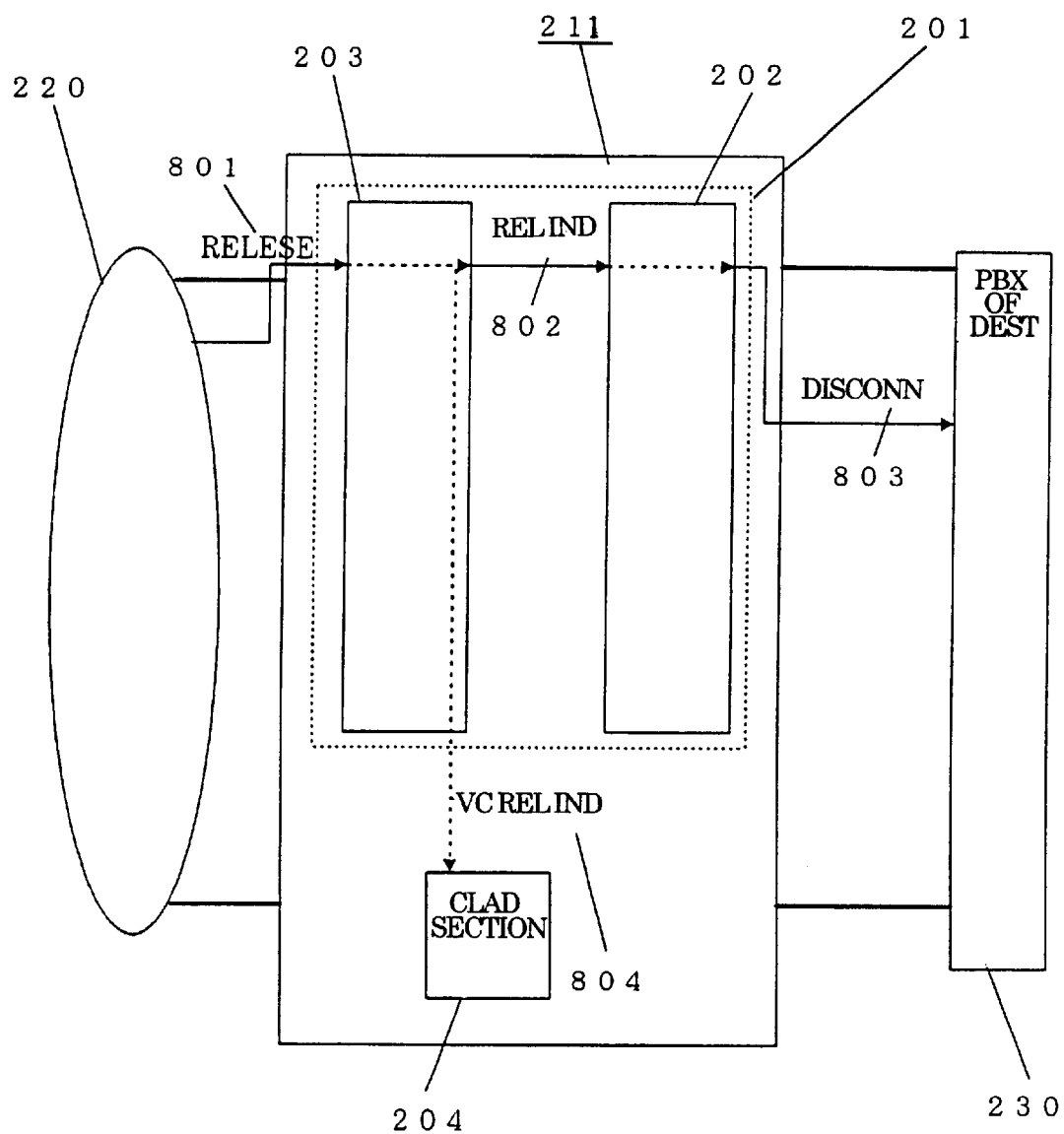
FIG. 8 is an operation sequence view of a call disconnect of destinating side in the case of the channel associated connection.

In addition to the aforementioned configuration, an appropriate circuit configuration in which, for example, the signaling convert section 201 is formed as a single unit, or a conversion unit is formed for each upward direction or downward direction, can be used. Also, the signaling convert section 201 and the CLAD section 204 can be formed as one unit. (2) Operations of System at a Channel Associated Connection FIG. 4 is an operation sequence view in which the ATM signaling method of the present invention and its apparatus are applied to a channel associated connection. Namely, this figure is a sequence view showing a case in which an interface between a PBX and an ATM network is connected by a channel associated connection using a call establish operation according to the present invention. Moreover, FIG. 5 is an operation sequence view of a call establish of originating side in the case of the channel associated connection, FIG. 6 is an operation sequence view of a call establish of destinating side in the case of the channel associated connection, FIG. 7 is an operation sequence view of a call disconnect of originating side in the case of the channel associated connection, and FIG. 8 is an operation sequence view of a call disconnect of destinating side in the case of the channel associated connection, respectively. Hereinafter, the operations will be described with reference to the configuration shown in FIG. 2 and FIG. 3.

(2-1) VC Connect Operations

Hereinafter, a description is given of VC connecting operations in the ATM signaling apparatus 210 of originating side, the ATM network 220 and the ATM signaling apparatus 211 of destinating side.

As shown in FIGS. 4 and 5, when the PBX 230 transmits setup signals, the non-ATM signaling interface section 202 of ATM signaling apparatus 210 receives setup signals 501 of PBX, and waits for a telephone number. When the non-ATM signaling interface section 202 receives telephone number 502, the non-ATM signaling interface section 202 conducts an analysis of number and sends a setup request 503 of originating side to the ATM signaling interface section 203. The ATM signaling interface section 203 converts the telephone number to ATM address and sends a SETUP message 504 to the ATM network 220. The ATM network 220 relays the SETUP message 504.

As shown in FIGS. 4 and 6, upon receipt of a SETUP message 604 from the ATM network 220, the ATM signaling interface 203 of the PBX interface 211 of destinating side converts ATM address to the telephone number and sends a setup request 603 of destinating side to the non-ATM signaling interface section 202. It should be noted that a CALL PROC message might be suitably sent in response to the SETUP message as shown in FIG. 4. The non-ATM signaling interface section 202 sends a setup signal 601 to the PBX 231 and further sends a called party number (e.g., telephone number) 602. Thereafter, the non-ATM signaling interface section 202 sends an alert indication 611 to the ATM signaling interface 203. The ATM signaling interface 203, which has received the alert indication, transmits an ALERT message 605 to the ATM network 220, designates VPI/VCI with respect to the CLAD section 204, and sends a user VC connect indication 209 thereto. At this time, connection control information of a user VC is included in information elements of the ALERT message 605 sent from the ATM signaling interface 203. The CLAD section 204 performs a VC connection 911, cell assembles user information 206 of the PBX 231, and sends it to the ATM network 220 as user cell 609.

Upon receipt of the ALERT message 605, the ATM network 220 relays the ALERT message 605, and performs a user VC connection 912 when connection control information of a user VC is VC controllable in information elements of ALERT message.

As shown in FIGS. 4 and 5, after receiving an ALERT message 505 from the ATM network 220, the ATM signaling interface 203 of the ATM signaling apparatus 210 of originating side designates VPI/VCI with respect to the CLAD section 204, and sends a user VC connect indication 209 thereto when connection control information of a user VC is VC controllable in information elements of ALERT message. The CLAD section 204 performs a VC connection 910, cell disassembles user cell 509 from ATM network, and sends it to the PBX 230 as user information 510.

As a result, when a telephone terminal of destinating side is busy, a busy tone sent from a PBX of destinating side is transmitted to a PBX of originating side. While, when the telephone terminal of destinating side is not busy, a ring back tone to be sent by a PBX of destinating side is sent using user signal 510 and transmitted to a PBX of originating side by user cell 509.

In the aforementioned case, the connection of only the user VC in the direction from the destinating side to the originating side is performed. However, this is not limited to the user VC in the direction from the destinating side to the originating side, and the connection of only the user VC in the direction from the originating side to the destinating side may be performed. Also, it is possible to perform the connection of bidirectional user VCs, namely one in the direction from the destinating side to the originating side and the other in the direction from the originating side to the destinating side. In this case, the connection of a user VC in either direction may be performed first, or the connection of user VCs in both directions may be performed simultaneously. Further, for example, number information of originating side, a kind of terminal, etc., can be named as information to be transmitted by a user VC in the direction from the originating side to the destinating side, but suitable information can be transmitted without limiting these information.

(2-2) Connection Path Establish is Give Operations

Next, a description n of the operation in which the connection path is established and the operation in which ATM network starts to count call duration.

Thereafter, as shown in FIGS. 4 and 6, the non-ATM signaling interface section 202 of the ATM signaling apparatus 211 on the destinating side sends a response 607 to the ATM signaling interface section 203 when receiving response signals 608 from the PBX 231 of destinating side. The ATM signaling interface section 203, which has received the response 608, sends a CONNECT message 606 to the ATM network 220. At this time, if a VC connection is uncompleted, the ATM signaling interface section 203 designates VPI/VCI with respect to the CLAD section 204, and sends user VC connection indication 209 thereto. The CLAD section 204 performs VC connection 911, cell assembles user information 610 of the PBX 30, and sends it to ATM network as user cell 609.

The ATM network 220 relays the CONNECT message 606 and sends back a CONN ACK message 612. At this time, the ATM network 220 performs VC connection 912 if a VC connection is uncompleted. Also, the ATM network 220 regards the CONN ACK message 612 as a telephone call in progress from the when the message is sent back, and starts to count call duration.

As shown in FIGS. 4 and 5, upon receipt of the CONNECT message 506 from the ATM network 220, the ATM signaling interface section 203 of the ATM signaling apparatus 210 of originating side sends a response 507 to the non-ATM signaling interface section 202. At this time, if a VC connection is uncompleted, the ATM signaling interface section 203 designates VPI/VCI with respect to the CLAD section 204 and sends user VC connection indication 209 thereto. The CLAD section 204 performs a VC connection 910, cell disassembles user cell 509, and sends it to PBX as user information. After receiving the response 507, the non-ATM signaling interface section 202 of originating side sends response signals 508 to the PBX 230, so that the connection path is established. It should be noted that establishment of communications means that connection of VP/JVC is established.

(2-3) Connection Path Disconnect Operations

Next, a description is given of the operation in which the connection path is disconnected and the operation in which ATM network ends counting call duration.

As shown in FIGS. 4 and 7, upon receipt of disconnect signals 701 from the PBX 231 on the designating side, the non-ATM signaling interface section 202 of the ATM signaling apparatus 210 of originating side sends a release indication 702 to the ATM signaling interface section 203. The ATM signaling interface section 203, which has received the release indication, sends a RELEASE message 703 to the ATM network 220. At this time, the ATM signaling interface section 203 designates VPI/VCI with respect to the CLAD section 204 and sends a user VC release indication 705 thereto. The CLAD section 204 stops cell assembling and cell disassembling on the basis of user the VC release indication 705.

The ATM network 220 relays the RELEASE message 703 and sends back a REL COMP message 704. At this time, ATM 220 performs VC release. Also, the ATM network 220 regards the RELEASE message as completion of call at the reception time, and counting of call duration is ended.

As shown in FIGS. 4 and 8, upon receipt of a RELEASE message 801 from the ATM network 220, ATM signaling interface 203 of ATM signaling apparatus 211 on the designating side sends a release indication to the non-ATM signaling interface section 202. At this time, the ATM signaling interface section 203 designates VPI/VCI with respect to the CLAD section 204 and sends a user VC release indication 804 thereto. After receiving a release indication 802, the non-ATM signaling interface section 202 sends disconnect signals 803 to the PBX 231, so that the connection path is disconnected.

(3) Operations of System at a Common Channel Connecting Time

Figure 9:
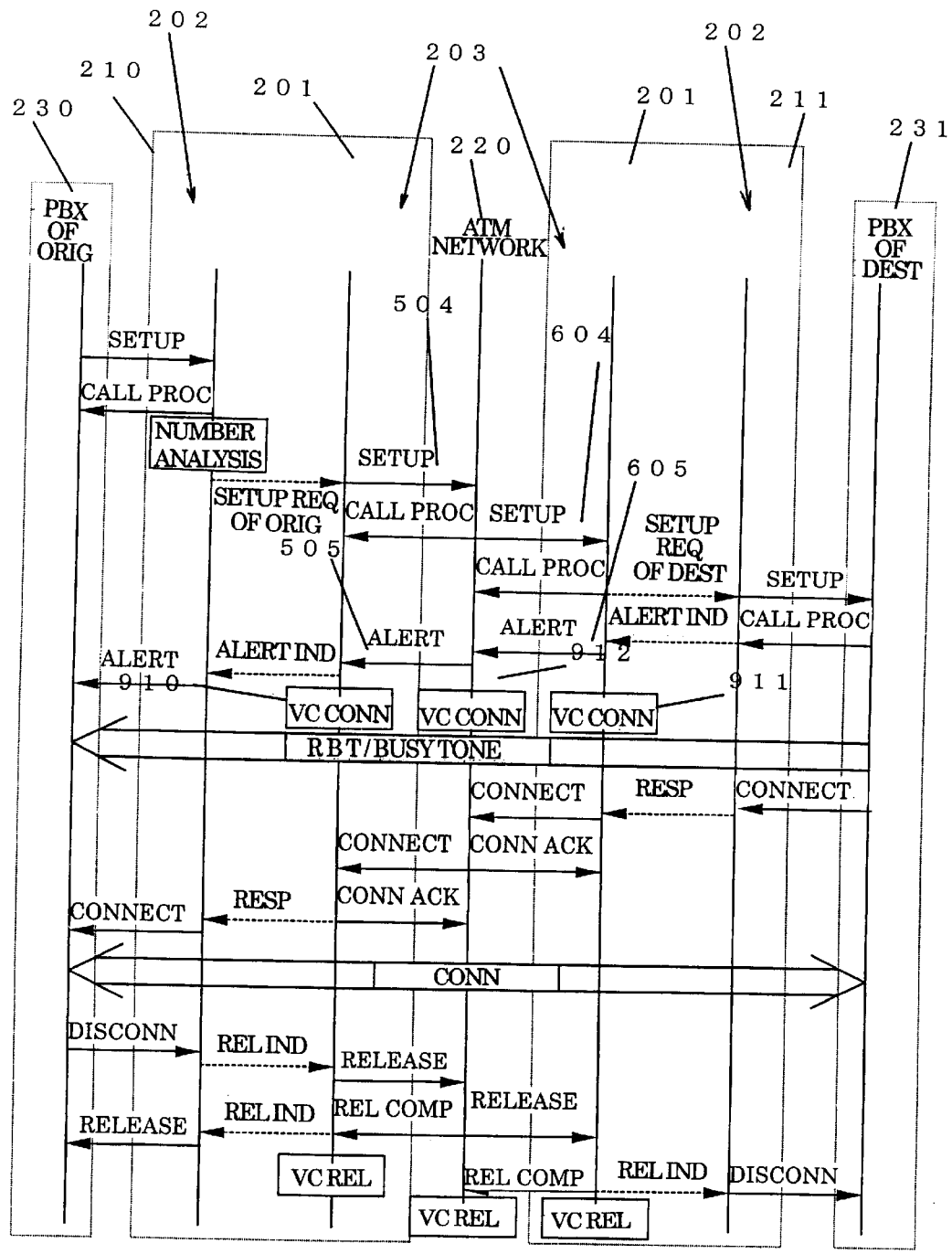
FIG. 9 is an operation sequence view in which the ATM signaling method of the present invention and its apparatus are applied to a common channel connection.
Figure 10:
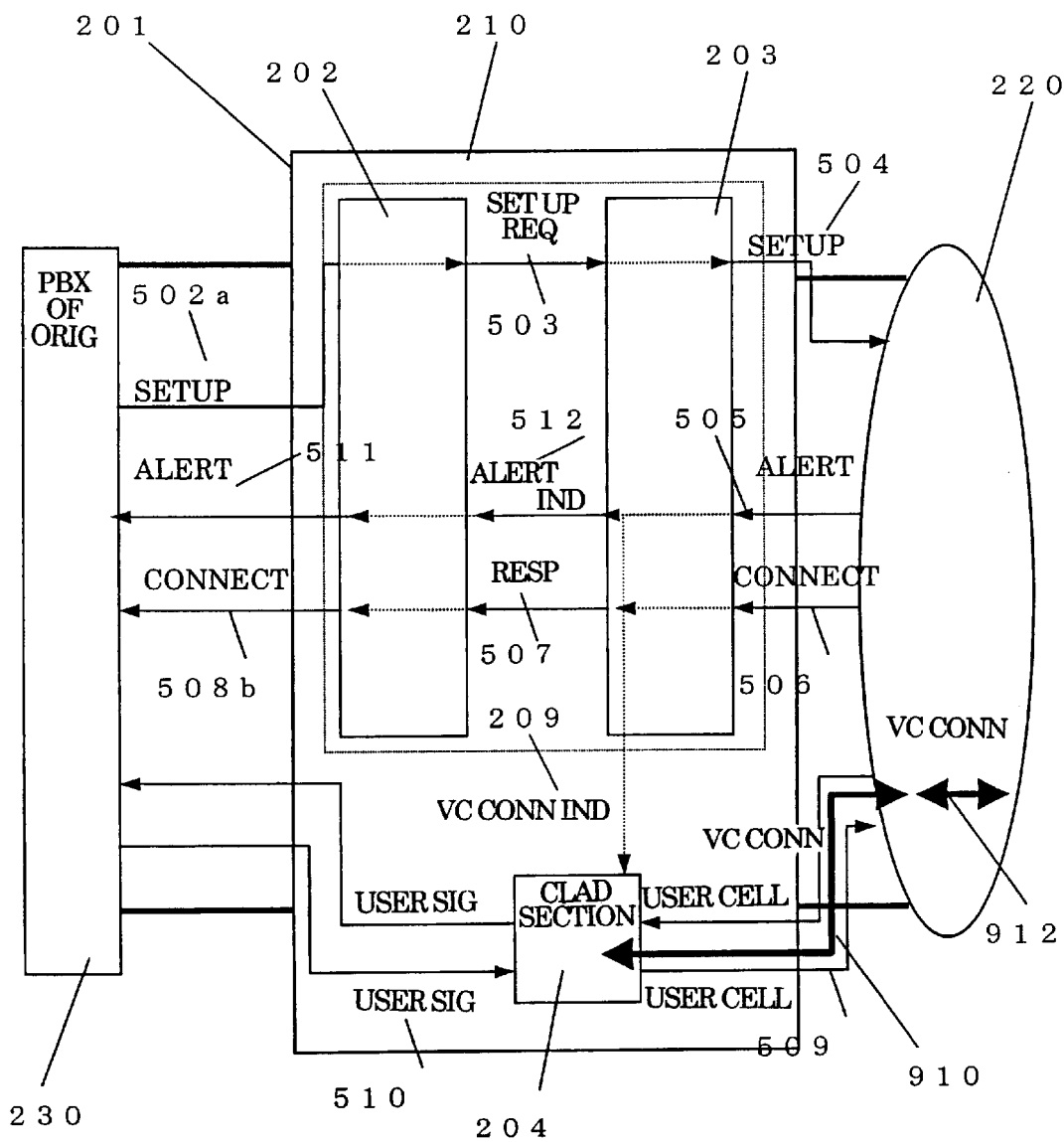
FIG. 10 is an operation sequence view of a call establish of originating side in the case of the common channel connection.
Figure 11:
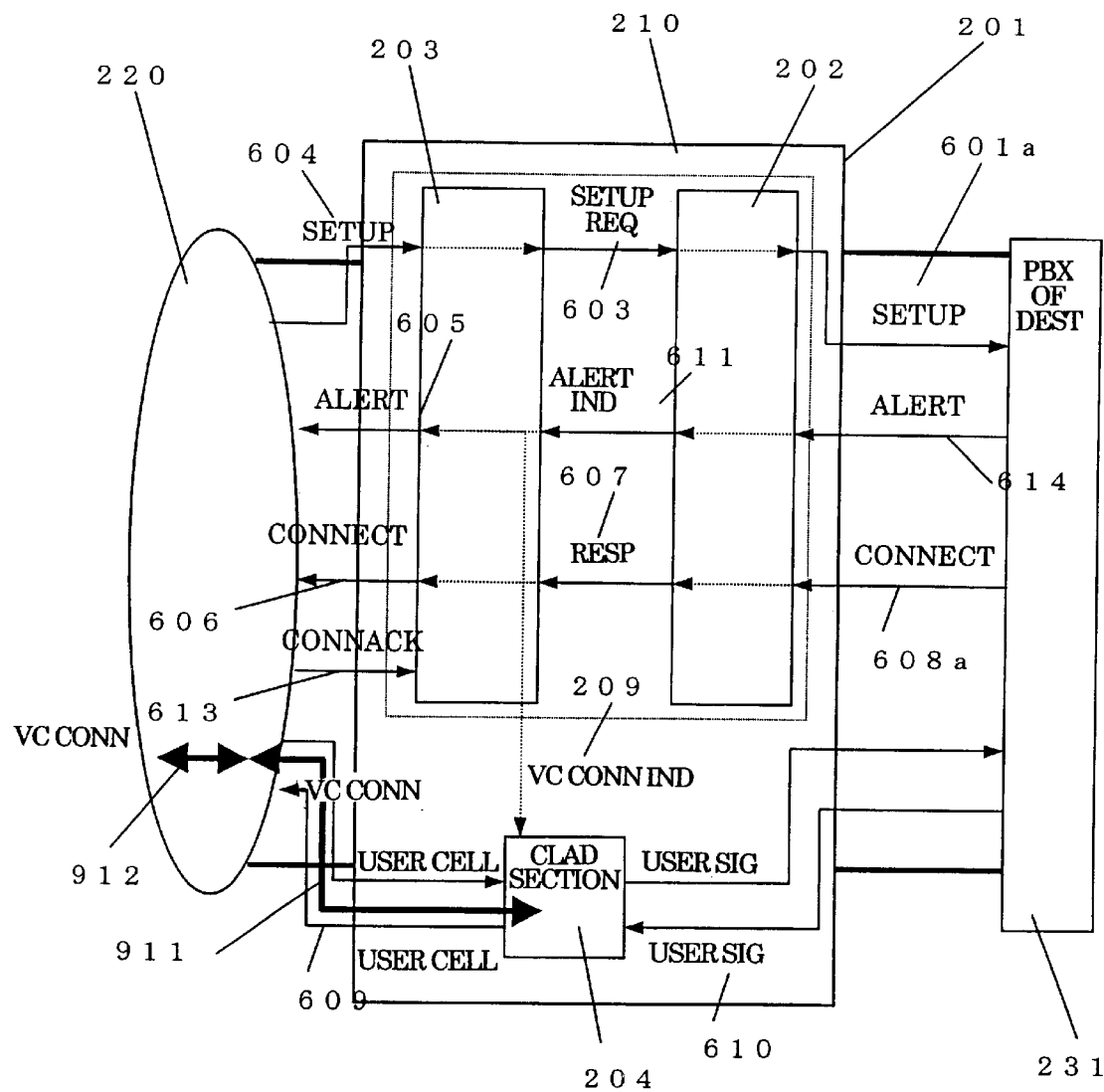
FIG. 11 is an operation sequence view of a call establish of destinating side in the case of the common channel connection.
Figure 12:
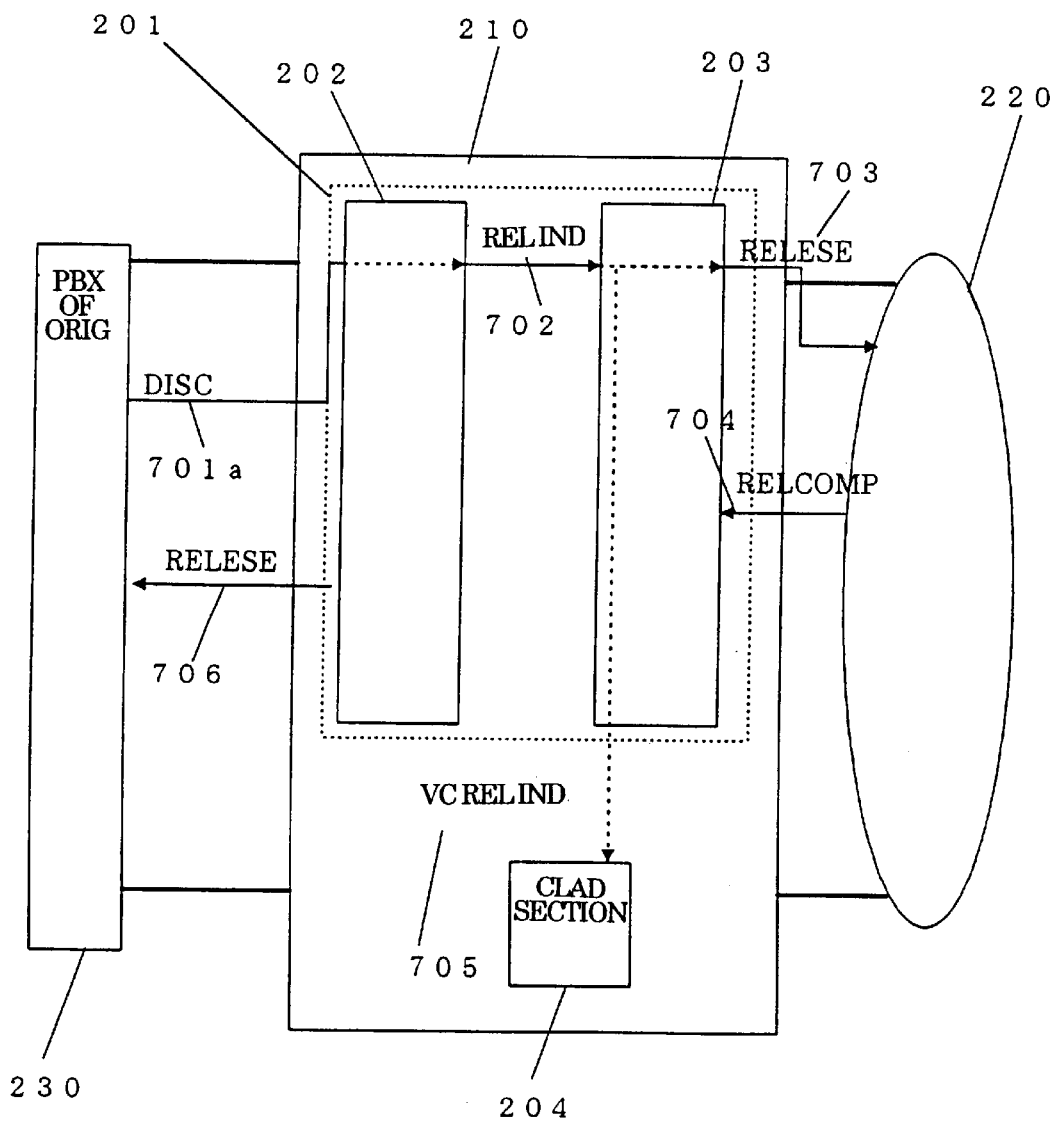
FIG. 12 is an operation sequence view of a call disconnect of originating side in the case of the common channel connection.
Figure 13:
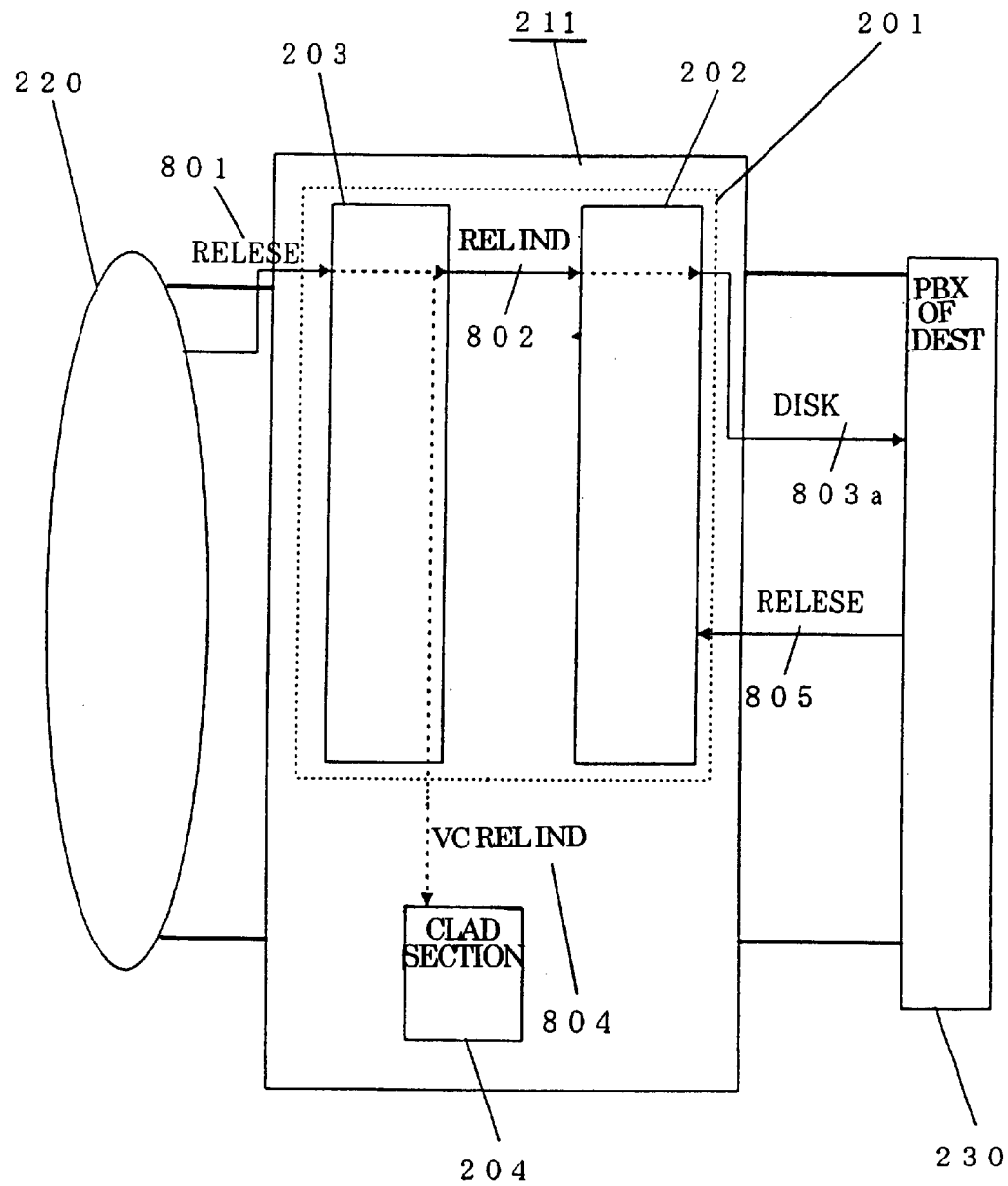
FIG. 13 is an operation sequence view of a call disconnect of destinating side in the case of the common channel connection.
Figure 14:
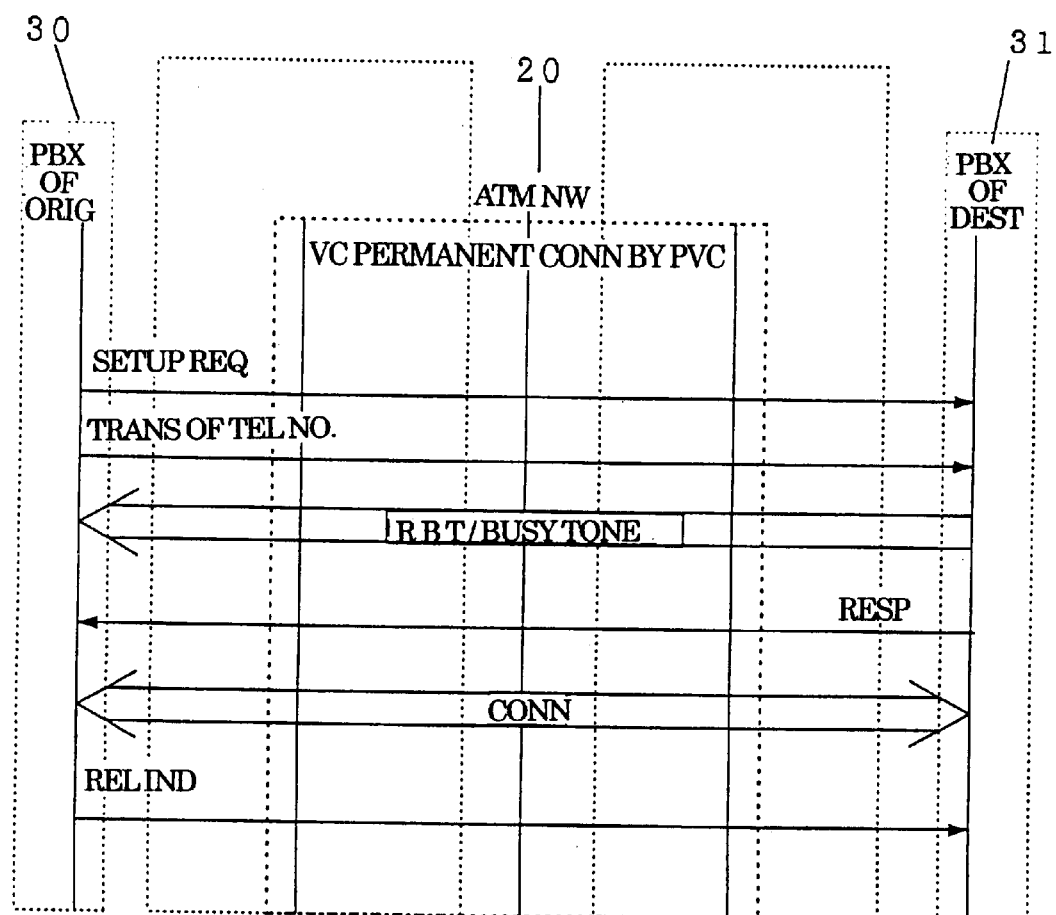
FIG. 14 is a sequence view of a communication establish in the case of a conventional permanent virtual connection (PVC)
Figure 15:
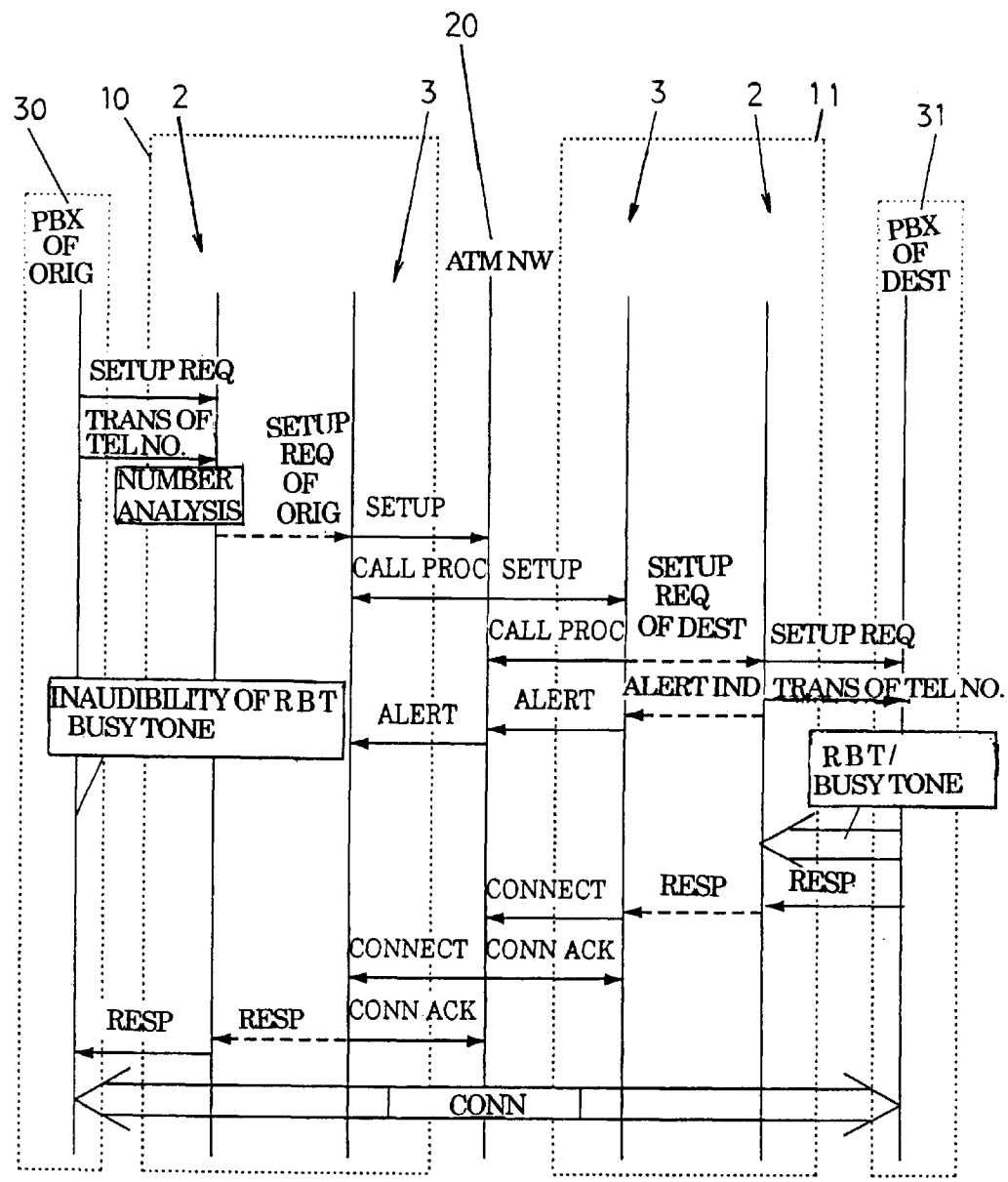
FIG. 15 is a sequence view of a conventional communication establish in ITU-T, Q. 2931.

FIG. 9 is an operation sequence view in which the ATM signaling method of the present invention and its apparatus are applied to a common channel connection. Namely, this figure is a sequence view showing a case in which an interface between a PBX and an ATM network is connected by a common channel connection using a call establish operation according to the present invention. Moreover, FIG. 10 is an operation sequence view of a call establish of originating side in the case of the common channel connection, and FIG. 11 is an operation sequence view of a call establish of destinating side in the case of the common channel, respectively. Also, FIG. 12 is an operation sequence view of a call disconnect of originating side in the case of the common channel connection, and FIG. 13 is an operation sequence view of a call disconnect of destinating side in the case of the common channel connection, respectively. Hereinafter, the operations will be explained with reference to the configuration shown in FIGS. 2 and 3.

(3-1) VC Connect Operations

Hereinafter, a description is given of VC connect operations in the ATM signaling apparatus 210 of originating side, the ATM network 220 and the ATM signaling apparatus 211 of destinating side.

As shown in FIGS. 9 and 10, when the PBX 230 transmits a SETUP message 502a, the non-ATM signaling interface section 202 of the ATM signaling apparatus 210 receives the SETUP message 502a, performs the number analysis of telephone number, and sends a setup request 503 of originating side to the ATM signaling interface section 203. The ATM signaling interface section 203 converts the telephone number to ATM address, and sends a SETUP message 504 to the ATM network 220.

The ATM network 220 relays the SETUP message 504. It should be noted that the CALL PROC message might be suitably sent back in response to the SETUP message as shown in FIG. 9.

As shown in FIGS. 9 and 11, upon receipt of the SETUP message 604 from the ATM network 220, the ATM signaling interface section 203 of the ATM signaling apparatus 211 of destinating side converts ATM address to the telephone number and sends a setup request 603 of destinating side to the non-ATM signaling interface section 202. After transmitting a SETUP message 601*a* to the PBX 231, the ATM signaling interface section 202 sends an alert indication 611 to the ATM signaling interface 203. The ATM signaling interface 203, which has received the alert indication 611, transmits an ALERT message 605 to the ATM network 220, designates VPI/VCI with respect to the CLAD section 204, and sends a user VC connection indication 209 thereto. At this time, connection control information of a user VC is included in information elements of the ALERT message sent from the ATM signaling interface 203. The CLAD section 204 of destinating side performs a VC connection 911, cell assembles user information 610 of the PBX 231, and send it to the ATM network 220 as user cell 609.

Upon receipt of ALERT message 605, the ATM network 220 relays the ALERT message 605. The ATM network 220 performs a user VC connection 912 when connection control information of a user VC is VC controllable in information elements of ALERT message 605.

As shown in FIGS. 9 and 10, upon receipt of the ALERT message 505 from the ATM network 220, the ATM signaling interface 203 of the ATM signaling apparatus 210 of originating side sends an alert indication 512 to the non-ATM signaling interface section 202. When connection control information of a user VC is VC controllable in information elements of ALERT message 505, the ATM signaling interface 203 designates VPI/VCI with respect to the CLAD section 204, and sends a user VC connect indication 209 thereto. The CLAD section 204 performs a VC connection 910, cell disassembles user cell 509 from ATM network, and sends it to the PBX 230 as user information 510. The non-ATM signaling interface section 202, which has received the alert indication 512, transmits an ALERT message 511 to the PBX 230 of originating side.

As a result, when a telephone terminal of destinating side is busy, a busy tone sent from a PBX of destinating side is transmitted to a PBX of originating side by the user cell 509. While, when the telephone terminal of destinating side is not busy, a ring back tone to be sent from a PBX of destinating side is transmitted to a PBX of originating side using user cell.

In the aforementioned case, the connection of only the user VC in the direction from the destinating side to the originating side is performed. However, this is not limited to the user VC in the direction from the destinating side to the originating side, and the connection of only the user VC in the direction from the originating side to the destinating side may be performed. Also, it is possible to perform the connection of bidirectional user VCs, namely one in the direction from the destinating side to the originating side and the other in the direction from the originating side to the destinating side. In this case, the connection of a user VC in either direction may be performed first, or the connection of user VCs in both directions may be performed simultaneously. Further, for example, number information of originating side, a kind of terminal, etc., can be named as information to be transmitted by a user VC in the direction from the originating side to the destinating side, but suitable information can be transmitted without limiting these information.

(3-2) Connection Path Establish Operation

Next, a description is given of the operation in which the connection path is established and the operation in which ATM network starts to count call duration.

Thereafter, as shown in FIGS. 9 and 11, the non-ATM signaling interface section 202 of ATM signaling apparatus 211 on the destianting side sends the response 607 to the ATM signaling interface section 203 when receiving a CONNECT message 608*a* from the PBX 231 of destinating side. The ATM signaling interface section 203, which has received the response 607, sends the CONNECT message 606 to the ATM network 220. At this time, if a VC connection is uncompleted, the ATM signaling interface section 203 designates VPI/VCI with respect to the CLAD section 204, and sends user the VC connection indication 209 thereto. The CLAD section 204 performs a VC connection 911, cell assembles user information 610 of the PBX 230, and sends it to the ATM network 220 as user cell 609.

The ATM network 220 relays the CONNECT message 606 and sends back a CONN ACK message 613. At this time, the ATM network 220 performs VC connection 912 if a VC connection is uncompleted. Also, the ATM network 220 regards the CONN ACK message 613 as a telephone call in progress, and starts to count call duration.

As shown in FIGS. 9 and 10, upon receipt of the CONNECT message 506 from the ATM network 220, the ATM signaling interface section 203 of the ATM signaling apparatus 210 of originating side sends the response 507 to the non-ATM signaling interface section 202. At this time, if a VC connection is uncompleted, the ATM signaling interface section 203 designates VPI/VCI with respect to the CLAD section 204, and sends user VC connection indication 209 thereto. The CLAD section 204 performs a VC connection 910, cell disassembles user cell 509, and sends it to PBX as user information. After receiving the response 507, the non-ATM signaling interface section 202 of originating side sends a CONNECT message 508*b* to the PBX 230, so that the connection path is established.

(3-1) Connection Path Disconnect Operation

Next, a description is given of the operation in which the connection path is disconnected and the operation in which ATM network finishes counting call duration in a case where the originating side performs the disconnection as an example.

As shown in FIGS. 9 and 12, upon receipt of a DISCONNECT message 701*a* from the PBX 231 on the destinating side, the non-ATM signaling interface 202 of the ATM signaling apparatus 210 of originating side sends a release indication 702 to the ATM signaling interface section 203. The ATM signaling interface section 203, which has received the release indication 702, sends a RELEASE message 703 to the ATM network 220. At this time, the ATM signaling interface section 203 designates VPI/VCI with respect to the CLAD section 204 and sends a user VC release indication 209 thereto. The CLAD section 204 stops cell assembling and cell disassembling.

The ATM network 220 relays the RELEASE message 703 and sends back a REL COMP message 704. At this time, ATM 220 performs VC release. Also, the ATM network 220 regards the RELEASE message 704 as an end of call, and counting of call duration is ended.

As shown in FIGS. 9 and 13, upon receipt of a RELEASE message 801 from the ATM network 220, the ATM signaling interface 203 of the ATM signaling apparatus 211 on the destinating side sends a release indication 802 to the non-ATM signaling interface section 202. At this time, the ATM signaling interface section 203 designates VPI/VCI with respect to the CLAD section 204 and sends a user VC release indication 209 thereto. Clad section 204 stops cell assembling and cell dissembling. After receiving a release indication 802, the non-ATM signaling interface section 202 of destinating side sends a DISCONNECT message 803*a* to the PBX 231, so that the connection path is disconnected.

(4) Application of ATM Signaling Method of the Present Invention and its Apparatus As mentioned above, the counting of call duration and the traffic statistic function of an ATM network make possible to collect the traffic statistic of a non-ATM apparatus. Also, it is possible to obtain information of such as a charge, line traffic in use, etc., on the basis of obtained call duration. It should be noted that call duration includes calling start time, and calling end time in addition to calling in progress. Moreover, combination of call duration and information such as a telephone number of destinating side, a bandwidth allocated, etc., can be applied to the network design.

Moreover, in an ATM network, traffic of a non-ATM apparatus contained in an ATM signaling apparatus is allocated to a traffic type of high priority class, and this makes it possible to pass traffic of a non-ATM apparatus higher priority when congestion occurs in an ATM network. Further, at the time of allocating traffic to priority class, traffic is not limited to the traffic type of high priority class, and namely, traffic of a non-ATM apparatus can be allocated to a traffic type of a low or suitable priority class as necessary in terms of network design.

Also, according to the ATM signaling apparatus and its method, in an ATM network, there can be provided a function of setting the band to be used by the non-ATM apparatus on the basis of the configuration. The configuration herein means that operating conditions of apparatus are set and variable information can be suitably set by parameters. As the configuration, for example, the following information can be named as a set value relating to ATM signaling messages. Namely, there are a maximum cell rate (cell/sec.), an average cell rate (cell/sec.), a minimum cell rate (cell/sec.), a maximum burst size (cell/sec.), and bearer classes (Constant Bit Rate (CBR), real time-Variable Bit Rate (rt-VBR), a on real time-Variable Bit Rate (nrt-VBR), Available Bit Rate (ABR), Unspecified Bit Rate (UBR)), Quality of service (QoS), etc.

In accordance with such configuration, a report band on the ATM signaling message is changed and connected, so that the network can be optimally established. Moreover, a band control function of an ATM network can be thus used effectively. The band control function herein means as follows. Namely, the network controls a band source, and rejects a connection setup request, which is beyond the band, if there is, and maintains the quality of the network. Since a PBX has no function of reporting the band in use to an ATM network, for example, an ATM signaling interface section of the signaling convert section, etc., can report the band in use to an ATM network according to the present invention.

What is claimed is:

1. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:

a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:

a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process, an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and means for receiving and transmitting information between said first signaling interface and said ATM signaling interface, wherein said ATM signaling interface section of destinating side converts an ATM address to a called party number when receiving a setup message from said ATM network, and sends a setup request to said first signaling interface section of destinating side, wherein said first signaling interface section of destinating side sends an alert indication to said ATM signaling interface section of destinating side after sending said first signaling information to said communication apparatus, wherein said ATM signaling interface section of destinating side, which has received said alert indication, sends an alert message including connection control information of user information to said ATM network, and transmits a connect indication to a cell assembly and disassembly section of destinating side, and wherein said cell assembly and disassembly section of destinating side cell assembles user information of said communication apparatus, sends said cell assembled user information to said ATM network as user cell, and performs a connection of a channel to transmit connect information such as a ring back tone and a busy tone to said ATM apparatus of originating side from said communication apparatus of destinating side.

2. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:

a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:
  a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process,
  an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and
  means for receiving and transmitting information between said first signaling interface and said ATM signaling interface,
  wherein said ATM signaling interface section of a destinating side converts a called party number to an ATM address when receiving a setup message from said ATM network, and sends a setup request to said first signaling interface section of the destinating side,
  wherein said first signaling interface of destinating side sends said alert indication to said ATM signaling interface section of destinating side after sending said first signaling information to said communication apparatus,
  wherein said ATM signaling interface section of destinating side, which has received said alert indication, sends said alert message including connection control information of user information to said ATM network, and transmits said connect indication to said cell assembly and disassembly section of destinating side, and
  wherein said cell assembly and disassembly section of destinating side cell disassembles a user cell from said ATM network, and sends it to said communication apparatus of destinating side as user information.

3. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:
  a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and
  a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:
  a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process,
  an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and
  means for receiving and transmitting information between said first signaling interface and said ATM signaling interface,
  wherein said ATM signaling interface section of originating side sends a connect indication to said cell assembly and disassembly section of originating side based on connection control information of user information included in an alert message when receiving said alert message from said ATM network, and
  wherein said cell assembly and disassembly section of originating side cell disassembles a user cell from said ATM network, and sends it to said communication apparatus as user information.

4. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:
  a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and
  a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:
  a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process, an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and means for receiving and transmitting information between said first signaling interface and said ATM signaling interface, wherein said ATM signaling interface section of originating side sends a connect indication to said cell assembly and disassembly section of originating side based on connection control information of user information included in said alert message when receiving said alert message from said ATM network, and wherein said cell assembly and disassembly section of originating side cell assembles said user information from said communication apparatus on the originating side, and sends said cell assembled user information to said ATM network as a user cell so as to transmit information to said communication apparatus of destinating side.

5. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:

a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:

a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process, an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and means for receiving and transmitting information between said first signaling interface and said ATM signaling interface, wherein said first signaling interface section of destinating side sends a response to said ATM signaling interface section of destinating side when receiving response signals from said communication apparatus of destinating side, wherein said ATM signaling interface section, which has received said response, sends a connect message to said ATM network, and transmits a connection indication to said cell assembly and disassembly section of destinating side, wherein said cell assembly and disassembly section of destinating side cell assembles user information of said communication apparatus of destinating side and sends a cell assembled user information to said ATM network as a user cell, wherein said ATM signaling interface of originating side sends said response to said first signaling interface of originating side when receiving said connect message from said ATM network, wherein said first signaling interface of originating side, which has received said response, sends response signals to said communication apparatus of originating side, and transmits said connect indication to said cell assembly and disassembly section of originating side, and wherein said cell assembly and disassembly section of originating side establishes a connection path.

6. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:

a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein said signaling convert section comprises:

a first signaling interface having means for controlling a status of said communication apparatus, means for receiving and transmitting said first signaling information from/to said communication apparatus, means for converting said first signaling information to said ATM signaling information, and means for converting said first signaling process to said ATM signaling process, an ATM signaling interface having means for controlling a status of said ATM network, means for receiving and transmitting said ATM signaling information from/to said ATM network, means for converting said ATM signaling information to said first signaling information, and means for converting said ATM signaling process to said first signaling process, and means for receiving and transmitting information between said first signaling interface and said ATM signaling interface, wherein said first signaling interface section of originating side sends a release indication to said ATM signaling interface section of originating side when receiving disconnect signals from said communication apparatus of originating side, wherein said ATM signaling interface section of originating side, which has received said release indication, sends a release message to said ATM network, and transmits a release indication to said cell assembly and disassembly section of originating side, wherein said cell assembly and disassembly section of originating side stops cell assemble and cell disassemble processing, wherein said ATM signaling interface of destinating side sends a disconnect request to said first signaling interface of destinating side after receiving said release message from said ATM network, and transmits a release indication to said cell assembly and disassembly section of destinating side, wherein said first signaling interface of destinating side sends disconnect signals to said communication apparatus of destinating side when receiving said release indication, and wherein said cell assembly and disassembly section of destinating side disconnects said connection path.

7. An Asynchronous Transfer Mode (ATM) signaling apparatus, which connects a communication apparatus to an ATM network so as to allow communications between a plurality of communication apparatuses to be carried out through said ATM network, said ATM signaling apparatus comprising:

a signaling convert section having means for receiving and transmitting first signaling information to be used in said communication apparatus from/to said communication apparatus, means for receiving and transmitting ATM signaling information to be used in said ATM network from/to said ATM network, means for interworking said first signaling information and said ATM signaling information, and means for interworking a first signaling process and an ATM signaling process; and a cell assembly and disassembly section for cell assembling user information from said communication apparatus to be transmitted to said ATM network, and for cell disassembling user information from said ATM network to be transmitted to said communication apparatus, whereby establishing and disconnecting communications between said communication apparatuses in accordance with said ATM signaling process, wherein connection control information indicating whether communications is established or not-established is included in information elements of an alert message, and wherein communications is established based on connection control information in said cell assembly and disassembly section, so that connect information such as a ring back tone and a busy tone sent by said communication apparatus of destinating side is transmitted to said communication apparatus of originating side via said connection path of said ATM network.

8. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein, in a destinating side, an ATM address is converted to a called party number when receiving a setup message from said ATM network, wherein an alert message including connection control information of user information is sent to said ATM network after sending said first signaling information to a communication apparatus of destinating side, and a connect indication on the destinating side is sent, and wherein said user information of said communication apparatus of destinating side is cell assembled and sent to said ATM network as a user cell, so that a connection of a channel is performed and connect information such as a ring back tone and a busy tone is transmitted to said ATM apparatus of originating side from said communication apparatus of destinating side.

9. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein, in a destinating side, an ATM address is converted to a called party number when receiving a setup message from said ATM network, wherein said alert message including connection control information of user information is sent to said ATM network after sending said first signaling information to said communication apparatus of destinating side, and a connect indication on the destinating side is sent thereto, and wherein a user cell from said ATM network is cell disassembled and sent to said communication apparatus of destinating side as user information.

10. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein, in an originating side, a connect indication of originating side is sent based on connection control information of user information included in an alert message when receiving a setup message from said ATM network, and wherein a user cell from said ATM network is cell disassembled and sent to said communication apparatus of originating side as user information.

11. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein, in an originating side, a connect indication of originating side is sent based on connection control information of user information included in an alert message when receiving a setup message from said ATM network, and wherein said user information from said communication apparatus of originating side is cell assembled and sent to said ATM network as a user cell, so that information is transmitted to said communication apparatus of destinating side.

12. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein, in a destinating side, a connect message is transmitted to said ATM network and a connect indication of destinating side is sent when receiving a response signal from said communication apparatus of destinating side, wherein said user information of said communication apparatus of destinating side is cell assembled and sent to said ATM network as a user cell, wherein while, in an originating side, said connect message is received from said ATM network, wherein said response signals are transmitted to said communication apparatus of originating side and said connect indication of originating side is sent, and wherein a connection path is established.

13. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein connection control information indicating whether communications is established or not-established is included in information elements of an alert message, and wherein communications is established based on connection control information, so that connect information such as a ring back tone and a busy tone sent by said communication apparatus of destinating side is transmitted to said communication apparatus of originating side via said connection path of said ATM network.

14. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein a response from said communication apparatus of destinating side is converted to a connect message of said ATM signaling information and transmitted, so that said ATM network identifies a call start when a connect acknowledge message corresponding to said connect message is sent back, and identifies a call end when a release message is received.

15. An Asynchronous Transfer Mode (ATM) signaling apparatus, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein traffic of said communication apparatus is allocated to a traffic of a high or low priority class or a predetermined traffic type of said ATM network.

16. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process;

cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process; and setting a band of said ATM network used by said communication apparatus based on a configuration, and a report band on said ATM signaling message is changed or set according to said configuration.

17. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein in an originating side, reception of said first signaling information of originating side including a called party number from a communication apparatus of originating side and an analysis of a number are performed, wherein said called party number is converted to an ATM address and a setup message is sent to said ATM network, wherein in a destinating side, said ATM address is converted to said called party number when receiving a setup message from said ATM network, wherein an alert message including connection control information of user information is sent to said ATM network after sending said first signaling information to said communication apparatus of destinating side, and a connect indication on the destinating side is sent thereto, and wherein a user cell from said ATM network is cell disassembled and sent to said communication apparatus of destinating side as user information.

18. An Asynchronous Transfer Mode (ATM) signaling method, which connects a communication apparatus to an ATM network so as to allow communications between a plurality of communication apparatuses to be carried out through said ATM network, said ATM signaling method comprising:

receiving and transmitting first signaling information to be used in said communication apparatus from/to said communication apparatus;

converting said first signaling information to ATM signaling information used in the ATM network;

converting a first signaling process to be used in said communication apparatus to an ATM signaling process to be used in said ATM network;

receiving and transmitting said ATM signaling information from/to said ATM network;

converting said ATM signaling information to said first signaling information;

converting said ATM signaling process to said first signaling process; and cell assembling user information from said communication apparatus to be transmitted to said ATM network, and cell disassembling user information from said ATM network to be transmitted to said communication apparatus, whereby establishing and disconnecting communications between communication apparatuses in accordance with said ATM signaling process, wherein in a destinating side, an ATM address is converted to a called party number when receiving a setup message from said ATM network, wherein an alert message including connection control information of user information is sent to said ATM network after sending said first signaling information to a communication apparatus of destinating side, and a connect indication on the destinating side is sent, wherein said user information of said communication apparatus of destinating side is cell assembled and sent to said ATM network as a user cell, so that a connection of a channel is performed and connect information such as a ring back tone and a busy tone is transmitted to said ATM apparatus of originating side from said communication apparatus of destinating side, wherein in a destinating side, said ATM address is converted to said called party number when receiving said setup message from said ATM network, wherein said alert message including connection control information of user information is sent to said ATM network after sending said first signaling information to said communication apparatus of destinating side, and said connection indication on the destinating side is sent thereto, and wherein a user cell from said ATM network is cell disassembled and sent to said communication apparatus of destinating side as user information.

* * * * *